Sept. 27, 1932.   B. F. KLEIN   1,879,317
BEVERAGE DISPENSER
Filed Oct. 3, 1930
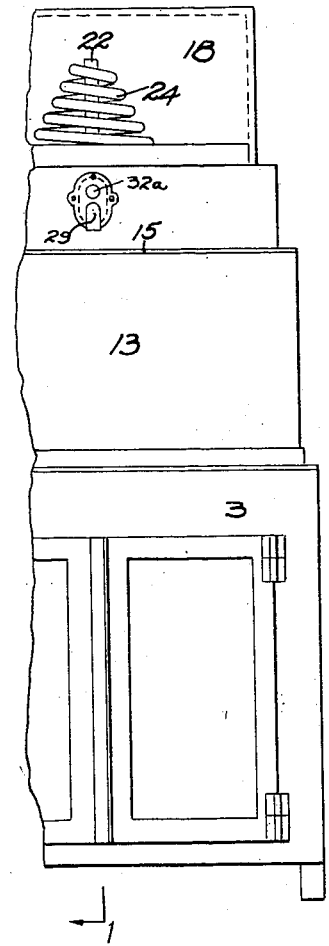
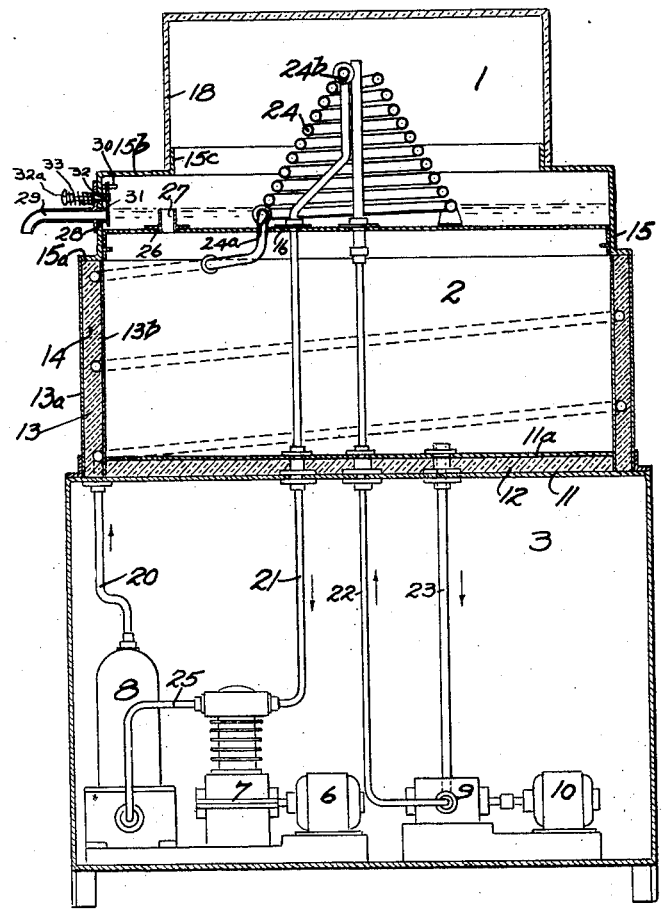
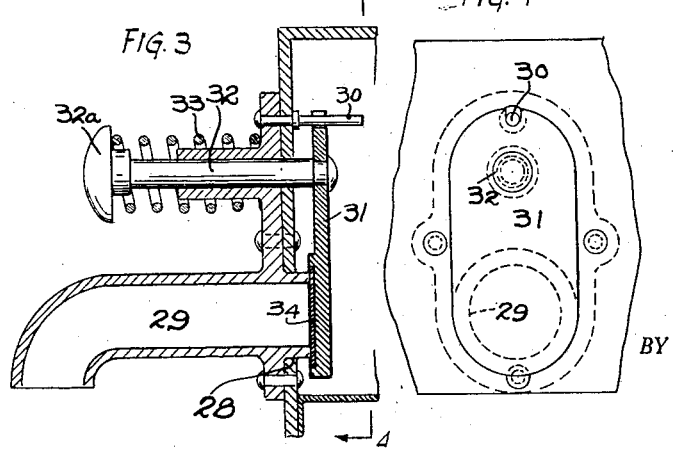
INVENTOR.
BENJAMIN F. KLEIN.
BY
ATTORNEY.

Patented Sept. 27, 1932

1,879,317

UNITED STATES PATENT OFFICE

BENJAMIN F. KLEIN, OF DETROIT, MICHIGAN

BEVERAGE DISPENSER

Application filed October 3, 1930. Serial No. 486,098.

This invention relates to improvements in beverage dispensers, and refers more particularly to dispensers for handling buttermilk, synthetic still drinks such as orangeade containing orangeade powder, fruit pulp, sugar and water, and malted milk drinks which require constant agitation to prevent separation of the ingredients and maintain the whole mixture homogeneous.

It is an object of the invention to provide a beverage dispenser wherein an upper compartment having a cooling coil therein is arranged over a storage tank, and to provide means for constantly pumping a stream of the beverage from the storage tank into the upper compartment so that it flows down over the coil onto the base of the upper compartment from which it overflows back into the storage tank. Thus ice is formed of a portion of the beverage around the cooling coil and the remainder of the beverage flows directly over the ice without possibility of dilution. In this manner not only is a very low temperature obtained on the beverage as it flows over the coil onto the base of the upper compartment from which it is dispensed; but the overflow from the upper compartment maintains a relatively cool temperature on the beverage in the storage tank; and the whole volume of the beverage is sufficiently agitated at all times by the circulating system to prevent its heavier constituent parts from settling, so that the whole of the beverage remains homogeneous.

Other objects of the invention are to provide a beverage dispenser wherein the coil is visible so that the ice thereon and the flow of beverage thereover may be seen for display purposes; and wherein special means are provided for dispensing the beverage from the upper compartment since both buttermilk and malted milk drinks do not flow freely enough at about 34° Fahrenheit to be quickly and easily dispensed through an ordinary faucet.

Having thus briefly outlined the major objects and advantages of the invention I will now proceed to describe one embodiment thereof in detail with the aid of the accompanying drawing in which:

Figure 1 illustrates a sectional elevation of the invention, taken on the line 1—1 of Figure 2.

Figure 2 is a partial front elevation.

Figure 3 shows an enlarged detail, and

Figure 4 is a view on the line 4—4 of Figure 3.

Referring to the drawing, 1 designates an upper compartment mounted in the present instance directly over a storage tank 2, which, in the embodiment of the invention shown, rests in turn upon a lower casing 3.

The lower casing 3 consists in the present instance of a cupboard-like structure and is utilized to house a refrigerating set comprising a motor 6, compressor 7 and a fluid refrigerant container 8, and also a pumping set comprising a pump 9 and motor 10.

In the present instance a member 11 forms both the top of the casing 3 and also the lower wall of the base of the storage tank 2. Spaced above the member 11 is an upper wall 11a and between them suitable insulation 12 is provided. The sides 13 of the storage tank 2 for the greater portion of its height also consist of double walls 13a and 13b spaced from one another. Between these double walls suitable insulation 14 is provided. Secured around the upper margins of the walls 13a and 13b is an outwardly directed annular flange 15a integral with an upwardly directed annular wall 15 and projecting from the lower extremity thereof. Removably arranged within the structure and extending horizontally intermediately of the height of the wall 15 is a partition 16 which forms both the top of the storage tank 2 and the base of the upper compartment 1. In the present instance the partition 16 is shown extending completely across the structure. The upper extremity of the annular wall 15 terminates in an inwardly directed horizontal wall portion 15b from the inner ends of which an upwardly directed annular flange 15c extends. A raised cover member 18, preferably made of glass or other transparent material, rests on the horizontal wall portion 15b with its lower inner margin contiguous to the outer side of the upwardly directed annular flange 15c.

Through the member 11 which forms the top of the casing 3 a plurality of pipes 20, 21, 22 and 23 extend.

The pipe 20 leads from the refrigerant container 8 into the space between the walls 13a and 13b where, intermediately of its length, it is coiled around the storage tank 2 in the insulation 14. The pipe 20 then passes through the inner wall 13b, through the upper portion of the storage tank 2, through the partition 16, and terminates in the upper compartment where it is attached to the lower extremity of a cooling coil 24 by a suitable connection 24a. To the upper end of the coil 24 the pipe 21 is suitably connected at 24b and extends downwardly through the partition 16, member 11 and wall 11a, and terminates at the compressor 7 from which a discharge line 25 runs to the refrigerant container 8.

The pipe 23 which terminates at its upper extremity in the storage tank 2 adjacent the base of the latter is connected to the suction side of the pump 9, and the pipe 22 constitutes the discharge line from the pump 9. This pipe 22 extends through the member 11, wall 11a and partition 16, and passes upwardly through the centre of the coil 24, terminating just above the top of the latter so that liquid discharged from the pipe will flow downwardly over said coil.

Through the partition 16 an aperture 26 is formed around the upper side of which an upwardly projecting overflow pipe 27 is secured so that when the liquid in the compartment 1 reaches the height of the top of said overflow pipe it flows back through the said pipe and aperture 26 into the storage tank 2.

It will be noted that the pipes 20, 21, 22 and 23 are provided with means, where they extend through the member 11, wall 11a and partition 16, for preventing leakage of liquid from the upper compartment 1 to the storage tank 2, or from the latter into the casing 3 around the said pipes.

Through the annular wall 15 an opening 28 is formed into and through which one extremity of a discharge spout 29 projects, which is suitably secured to said wall. The top of this opening 28 must be below the top of the overflow pipe 27. Projecting inwardly from the wall 15 over the opening 28 is a horizontal guide member 30 on which a closure plate 31 is slidably arranged, and extending outwardly from the plate 31 is a control rod 32 which projects through an aperture 33 formed through the wall 15 also above the level of the top of the overflow pipe 27. An enlargement 32a is formed on the outer extremity of the control rod 32, and around the latter a helical spring 33 is arranged which extends between the outer side of the wall 15 and said enlargement, and tends to force the rod 32 outwards, thereby normally holding the closure plate 31 against the inner side of the discharge spout 29 and preventing escape of liquid through the latter. When the control rod 32 is pressed inwardly against the tension of the spring 33 the closure plate 31 is moved inwardly from the inner end of the discharge spout 29 thereby permitting an outwardly flow of liquid through said spout. 34 indicates a gasket of suitable material on the side of the closure plate 31 adjacent the discharge spout, to prevent leakage through the latter when said plate is in closed position.

From the foregoing it will be seen that a beverage discharge from the pipe 22 falls downwardly over the coil 24 around which a portion of the beverage freezes; and the remainder flows over the ice thus formed onto the partition 16 which constitutes the base of the upper compartment 1. From the latter the beverage is dispensed through the spout 29. The height of the overflow pipe 27 of course determines the normal height of the beverage in the upper compartment. Surplus beverage returns to the storage tank 2 through the overflow pipe 27 thereby maintaining a relatively low temperature in said tank.

As it is in most cases desirable that the temperature of the beverage in the storage tank 2 remains somewhat higher than in the upper compartment I find that one or two coils of the pipe 20 between the walls 13a and 13b are generally sufficient. This applies particularly when buttermilk or malted milk beverages are to be dispensed, for it is found in practice that the invention will maintain a temperature of about 34° on the beverage in the upper compartment which is ready for dispensing, and at that temperature neither of the drinks mentioned above flow very freely. A somewhat higher storage tank temperature therefore facilitates the operation of the pump and eliminates any tendency for the discharge pipe 22 to become choked. It is for the reason that the beverages named do not flow very freely at the temperature at which my dispenser will dispense them that a special outlet arrangement including the spout 29 and closure plate 31 were found necessary.

The constant agitation of the beverages due to their being circulated by the pump 9 retains the malted milk drinks homogeneous, and prevents the curds and whey of the buttermilk from separating; and, as the ice formed around the coil 24 consists of the beverage itself no dilution occurs though the beverage flows directly over the ice-coated coil.

Though I prefer to place the upper compartment 1 immediately over the storage tank 2, the two vessels may, of course, be spaced apart so long as the upper compartment 1 remains above the storage tank so that the beverage may flow back from the former to the latter by gravity.

Again, the refrigerating and pumping sets may of course be positioned differently relative to the upper compartment 1 and storage tank 2, though I prefer to employ the compact arrangement shown in most instances.

While in the foregoing the preferred embodiment of the invention has been described and shown, it is understood that the invention is susceptible to such alterations and modifications as fall within the scope of the appended claims.

What I claim as my invention and desire to secure by Letters Patent is:

1. In a beverage dispenser, the combination of a storage tank, an upper compartment arranged thereover, a cooling coil in the latter, means for pumping a beverage from said tank into said upper compartment so that it flows downwardly over said cooling coil, a portion of said beverage being adapted to freeze around said coil and the rest of said beverage being adapted to flow downwardly over the ice thus formed, means for dispensing the beverage from said upper compartment, and means permitting surplus beverage to flow back from the upper compartment into said storage tank after a predetermined height of beverage has been attained therein, so that normally the beverage remains at a constant level therein.

2. In a beverage dispenser, the combination of a storage tank, an upper compartment thereover, a cooling coil in said compartment, a removable partition forming both the base of said upper compartment and the top of the storage tank, means for pumping a beverage from the storage tank into the upper compartment and discharging it over said coil so that it flows downwardly over the latter, means permitting excess beverage to flow back from the upper compartment into the storage tank after a predetermined height is attained in said compartment, and means for dispensing the beverage from said upper compartment.

3. In a beverage dispenser, the combination of an upper compartment, a storage tank beneath it, a casing below said storage tank, a refrigerating unit in said casing, a pumping unit in said casing, a suction pipe to said pumping set terminating in said storage tank adjacent its base, a discharge pipe from said pumping set terminating in said upper compartment, a cooling pipe from said refrigerating set extending around said storage tank and terminating in said upper compartment, a cooling coil in the latter connected to said cooling pipe, said pumping set discharge pipe being so positioned as to deliver a beverage onto the top of said cooling coil, said cooling coil being vertically arranged, a return pipe from said coil to said refrigerating unit, one side of the upper compartment having a dispensing opening therethrough, means for closing said opening, and means permitting excess beverage pumped into the upper compartment to flow back into the storage tank after a predetermined height of beverage has been attained in said upper compartment, said dispensing opening being below said predetermined height.

4. In a beverage dispenser, the combination of an upper compartment having a storage tank beneath it, said tank having double walls for the greater part of its height, a partition forming both the top of said storage tank and the base of said upper compartment, an annular wall projecting upwardly from said double wall forming both the top of said storage tank and the lower portion of the upper compartment, said partition being removably supported transversely of said annular wall, an inwardly directed horizontal portion integral with the top of said annular wall, an annular flange projecting upwardly from the inner margin of said horizontal portion, a removable transparent cover member on said horizontal portion, a cooling coil in said upper compartment, a cooling pipe encircling said tank between said double walls and connected to said cooling coil, means for pumping a beverage from said storage tank into said upper compartment and discharging it so that it flows downwardly over said cooling coil, means permitting excess beverage to flow from said upper compartment back to said storage tank after it has reached a predetermined depth in said compartment, and means for dispensing the beverage from said upper compartment.

BENJAMIN F. KLEIN.